United States Patent [19]

Matsuzawa et al.

[11] Patent Number: 5,255,126

[45] Date of Patent: Oct. 19, 1993

[54] AGC CIRCUIT WITH CONSTANT ENVELOPE CIRCUIT FOR REPRODUCED RF SIGNALS FROM PLURAL CHANNELS

[75] Inventors: Hiroshi Matsuzawa; Ichitaro Sato; Kaoru Urata, all of Kanagawa, Japan

[73] Assignee: Sony Corporation, Japan

[21] Appl. No.: 724,151

[22] Filed: Jul. 1, 1991

[30] Foreign Application Priority Data

Jul. 6, 1990 [JP] Japan .................................. 2-178777

[51] Int. Cl.$^5$ .............................................. G11B 5/02
[52] U.S. Cl. ..................................... 360/27; 358/315; 360/67
[58] Field of Search ................... 360/27, 67; 358/315, 358/318

[56] References Cited

U.S. PATENT DOCUMENTS

| | | | |
|---|---|---|---|
| 3,949,414 | 4/1976 | Hayashi | 358/316 |
| 4,041,526 | 8/1977 | Kaneko | 358/318 |
| 4,445,142 | 4/1984 | Horstmann | 358/315 X |
| 4,700,239 | 10/1987 | Yoshinaka et al. | 358/318 X |
| 4,991,034 | 2/1991 | Sato | 360/67 |

Primary Examiner—James B. Mullins
Attorney, Agent, or Firm—Ronald P. Kananen

[57] ABSTRACT

A recording and reproducing apparatus in which signals are recorded onto and reproduced from a magnetic tape wound around a peripheral surface of a rotary drum by magnetic heads which are attached to the peripheral surface of the rotary drum corresponding to a plurality of channels, respectively, comprises at least: a detector to detect an envelope level of a reproduced RF signal which is derived from the magnetic head every channel; a comparator to compare the detection output and a reference level and to generate a control voltage corresponding to the magnetic head every channel; a latch to store the control voltage; and a circuit to make the envelope level of the reproduction RF signal constant in accordance with a predetermined timing for supplying the control voltage.

12 Claims, 4 Drawing Sheets

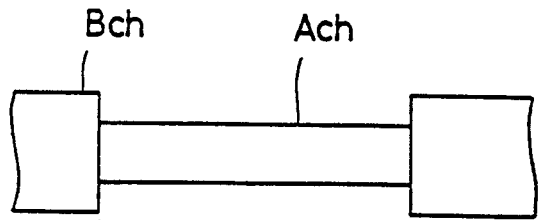
Fig. 1A WEN
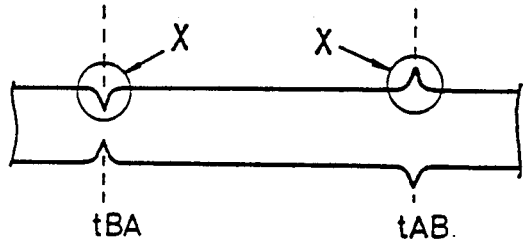
Fig. 1B WEN
Fig. 2
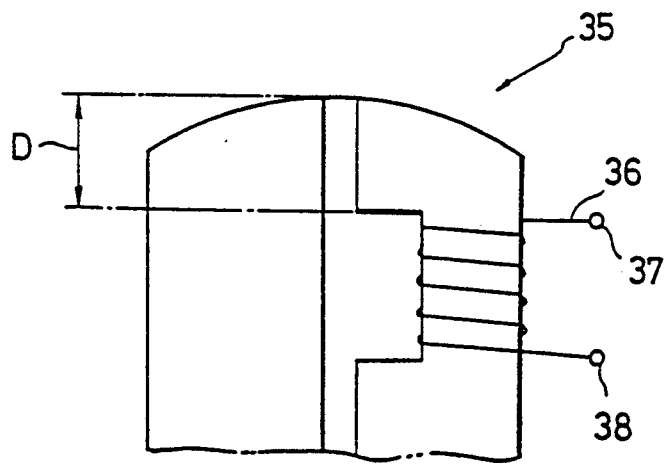

AGC CIRCUIT WITH CONSTANT ENVELOPE CIRCUIT FOR REPRODUCED RF SIGNALS FROM PLURAL CHANNELS

BACKGROUND OF THE INVENTION

1. Field of the Invention

The present invention relates to a recording and reproducing apparatus and, more particularly, to a recording and reproducing apparatus which is suitable for use in a rotary head type video tape recorder.

2. Description of the Prior Art

In general, a gain of a reproducing amplifier is set to only a single value or to a plurality of special values corresponding to modes such as a normal reproducing mode, a variable speed reproducing mode, and the like. An AGC circuit is made operative for an excessive input signal.

In the above conventional technique, for instance, in the case where RF signals of envelope waveforms WEN of different envelope levels are obtained from A and B channels, respectively, as shown in FIG. 1A, when levels of the RF signals are detected, a gain control is executed without distinguishing the A and B channels, so that there is a problem such that it is difficult to finely adjust the level. Therefore, there are problems such that a circuit to cope with variations in dynamic range and input level needs to be provided for a video signal processing circuit at the post stage. The above problem becomes a cause of deterioration in characteristics.

According to the conventional technique using the AGC circuit, the gain control is performed for the continuous RF signals which are derived from both of the A and B channels as shown in FIG. 1A, so that there are problems such that a reaction is delayed due to a time constant of the response and waveforms like mustaches appear as shown by arrows X in FIG. 1B at change points (i.e., switching time points of the channels in the example shown in the diagram) $t_{BA}$ and $t_{AB}$.

The envelope levels of the reproduction RF signals for a recording current depend on a length (hereinafter, referred to as a depth) D of a tip portion of a magnetic head 35 shown in FIG. 2. When the magnetic head 35 is abraded and the depth D decreases due to the use of the video tape recorder for a long time, a reproducing sensitivity of the magnetic head 35 is improved, so that the envelope levels of the RF signals also increase. In FIG. 2, reference numeral 36 denotes a coil and reference numerals 37 and 38 indicate terminals to supply a recording current, respectively.

There are problems such that it is difficult to correct such a time-dependent change of the magnetic head by the conventional techniques and such a time-dependent change becomes a cause of the deterioration in characteristics of the video signal.

Further, there are problems such that the conventional adjusting works are complicated and require the experienced operations and also need a large number of adjusting steps.

OBJECTS AND SUMMARY OF THE INVENTION

It is, therefore, an object of the invention to provide a recording and reproducing apparatus in which a gain control for reproducing RF signals can be performed for each of a plurality of channels.

According to an aspect of the invention, there is provided a recording and reproducing apparatus in which signals are recorded onto and reproduced from a magnetic tape wound around a peripheral surface of a rotary drum by magnetic heads which are attached to the peripheral surface of the rotary drum corresponding to a plurality of channels, respectively, comprising at least: means for detecting an envelope level of a reproduction RF signal which is derived from the magnetic head for every channel; means for comparing the detection output and a reference level and for generating a control voltage corresponding to the magnetic head for every channel; means for storing the control voltage; and means for making the envelope level of the reproduction RF signal constant in accordance with a timing to supply the control voltage.

The above and other objects, features, and advantages of the present invention will become readily apparent from the following detailed description thereof which is to be read in connection with the accompanying drawings.

BRIEF DESCRIPTION OF THE DRAWINGS

FIGS. 1A and 1B are signal waveform diagrams for explaining conventional problems;

FIG. 2 is a diagram showing a depth in a magnetic head;

DETAILED DESCRIPTION OF THE PREFERRED EMBODIMENT

An embodiment of the invention will be described hereinbelow with reference to the drawings.

Figure 3:
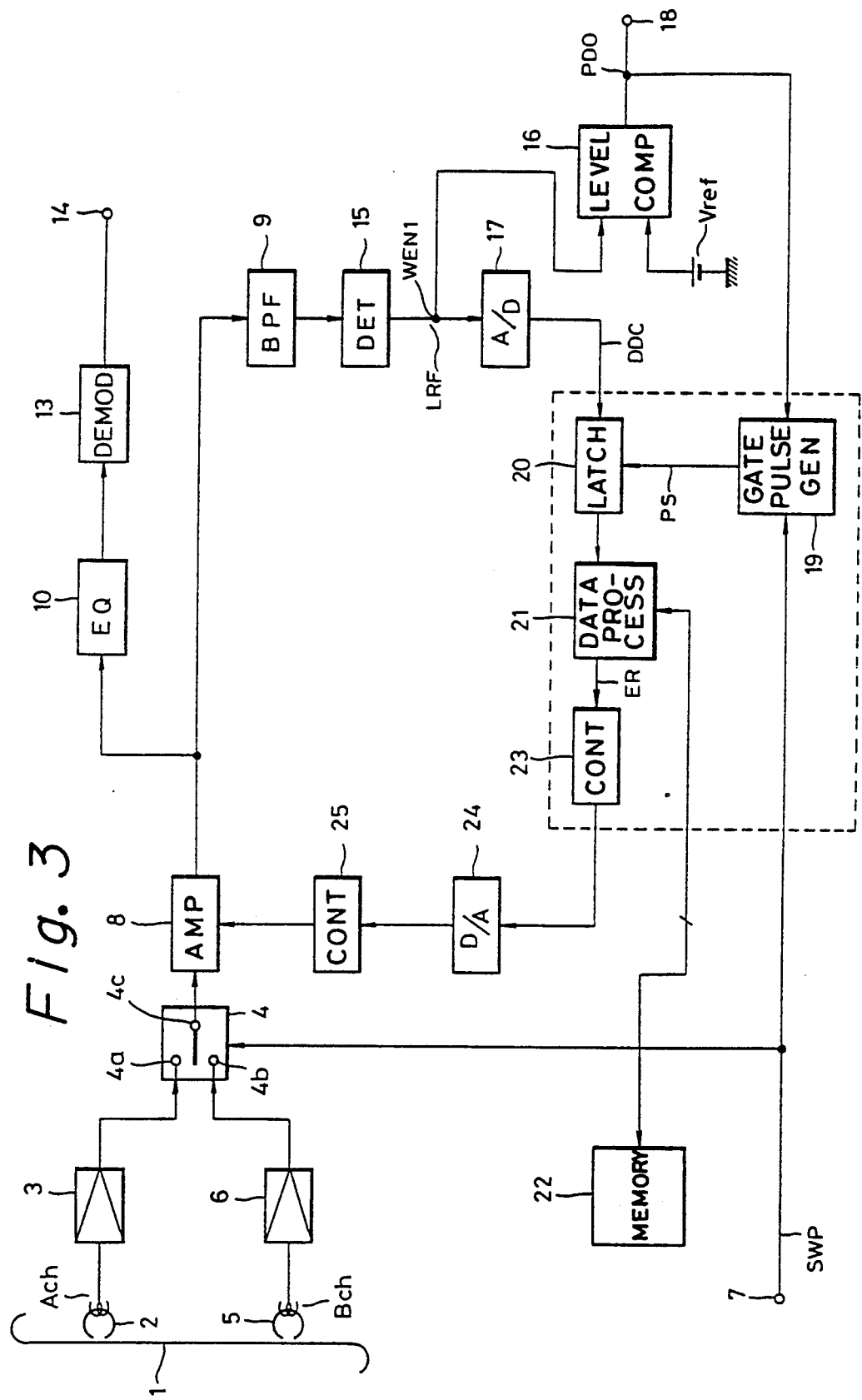
FIG. 3 is a block diagram showing an embodiment of the invention.
Figure 4:
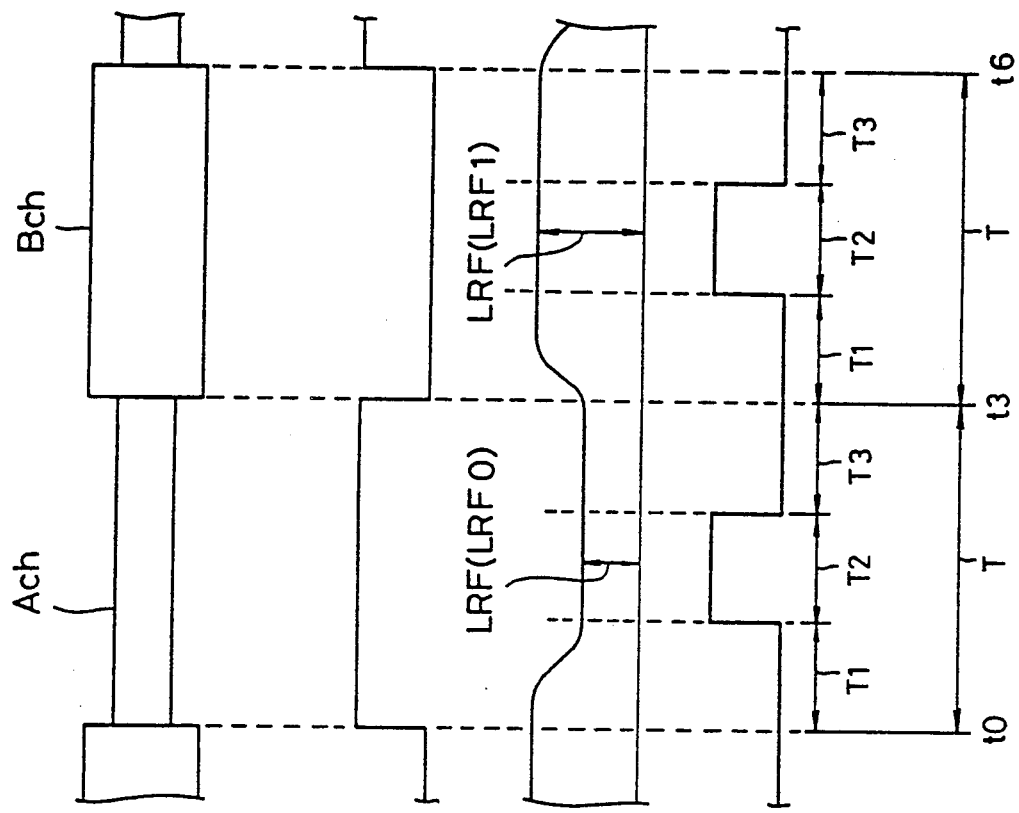
FIGS. 4A to 4D are signal waveform diagrams for explaining the operation of an embodiment of the invention.

In a construction of FIG. 3, an RF signal of an envelope waveform WEN shown in FIG. 4A is reproduced from a magnetic tape 1 by a magnetic head 2 of an A channel. The RF signal is supplied through an amplifier 3 to a terminal 4a of a switch 4. Another RF signal of the envelope waveform WEN shown in FIG. 4A is also reproduced from the magnetic tape 1 by a magnetic head 5 of a B channel and is supplied through an amplifier 6 to a terminal 4b of the switch 4.

Figure 5:
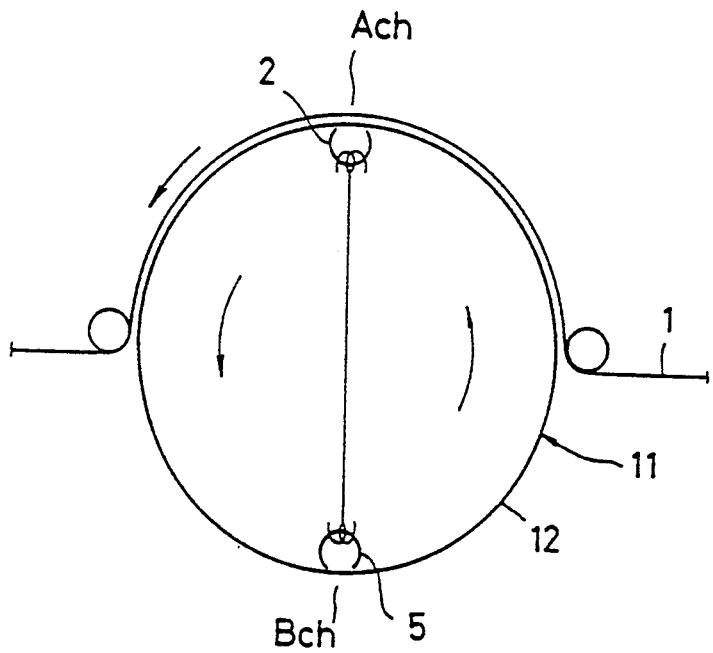
FIG. 5 is a diagram showing an arrangement of magnetic heads.

FIG. 5 shows the details of an arrangement of the magnetic heads 2 and 5. As shown in FIG. 5, the magnetic head 2 of the A channel and the magnetic head 5 of the B channel are attached to a peripheral surface 12 of a rotary drum 11 so as to face each other at a distance of an angle of 180°. The magnetic tape 1 is wound around the peripheral surface 12 of the rotary drum 11. In FIG. 5, arrows indicate a rotating direction of the rotary drum 11 and a moving direction of the magnetic tape 1.

A connecting state of the switch 4 is controlled by a switching pulse SWP which is supplied through a terminal 7. When reproducing the signal of the A channel, terminals 4a and 4c of the switch 4 are connected. When reproducing of the signal of the B channel, the terminals 4b and 4c of the switch 4 are connected. The RF signal selected by the switch 4 is supplied to a reproducing amplifier 8.

After a gain control, which will be explained hereinlater, for the above RF signal was executed by the reproducing amplifier 8, it is supplied to a band pass filter 9 and an equalizer 10, respectively.

After the RF signal was equalized by the equalizer 10 so as to have predetermined characteristics, it is supplied to a frequency demodulating circuit 13, so that a frequency demodulated video signal is fetched from a terminal 14. The video signal is supplied to a signal processing circuit (not shown) connected to the post stage and is processed.

In the RF signal, the RF signal at a frequency near a center carrier frequency is extracted by the band pass filter 9 and is supplied to a detecting circuit 15. The detecting circuit 15 can be commonly constructed by an RF detecting circuit for control of a signal dropout.

The center carrier frequency differs depending on the kind of magnetic tape 1 which is used. To set the optimum reproducing state according to the kind of the magnetic tape 1, it is necessary to perform the following signal processes on the basis of the RF signal at a frequency near the center carrier frequency. The kind of the magnetic tape 1 is discriminated by checking a hole formed in a tape cassette.

An envelope of the RF signal is detected by the detecting circuit 15, so that an envelope level LRF of the RF signal is derived. The envelope level LRF of the RF signal is supplied to a level comparator 16 and an A/D converter 17.

A voltage of the RF signal is compared with a reference voltage Vref by the level comparator 16. If the envelope level LRF of the RF signal is lower than the reference voltage Vref, a dropout output pulse PDO is generated. The dropout pulse PDO is fetched from a terminal 18 and is supplied to a gate pulse generating circuit 19.

The RF signal is converted into digital data DDC by the A/D converter 17 and is supplied to a latch 20.

The switching pulse SWP is supplied to the gate pulse generating circuit 19. On the basis of the switching pulse SWP, a sampling pulse PS to specify a fetching timing of the data DDC into the latch 20 is generated for every channel of A and B. The dropout pulse PDO and the switching pulse SWP are supplied to the gate pulse generating circuit 19. In addition to those pulses, a vertical sync signal can be also supplied to the gate pulse generating circuit 19.

The sampling pulse PS is used to sequentially fetch an envelope level LRF0 of the A channel and an envelope level LRF1 of the B channel of an envelope waveform WEN1 shown in FIG. 4C. The sampling pulse PS is generated at the high level ("1") for a period of time T2 of a (½) field from a time point of the elapse of a period T1 of a (½) field after the start of the tracing operations of the magnetic heads 2 and 5 on the magnetic tape 1.

The data DDC from the A/D converter 17 is fetched into the latch 20 and supplied to a data processing circuit 21 at a timing when the sampling pulse PS is supplied from the gate pulse generating circuit 19 to the latch 20.

The data DDC is compared with predetermined reference data held in a memory 22 and an error ER is formed by the data processing circuit 21. The error ER is written into the memory 22 and is supplied to an output data control circuit 23. In order to match the data of the error ER which is supplied from the data processing circuit 21 to a desired data format of a D/A converter 24, the control circuit 23 connects the error data ER, for instance, from the parallel data to the serial data or from the serial data to the parallel data.

The error data ER is supplied to the D/A converter 24 through the output data control circuit 23.

The error data ER is converted into the analog voltage by the D/A converter 24. The analog voltage is supplied to a gain controller 25.

The analog voltage is converted into a gain control signal SCG to control the gain of the reproducing amplifier 8 by the gain controller 25. The signal SCG is supplied to the reproducing amplifier 8.

In the reproducing amplifier 8, the gain controls of the A and B channels are executed on the basis of the gain control signal SCG of the present field which is supplied from the gain controller 25 in place of the gains of the preceding fields held in correspondence to the A and B channels, respectively.

Although the embodiment has been described with respect to an example in which the latch 20, gate pulse generating circuit 19, data processing circuit 21, and output data control circuit 23 shown in a section surrounded by a broken line in FIG. 3 have been provided as individual circuit blocks, respectively, the invention is not limited to such a construction. The section of the above circuit blocks can be also processed by replacing them with a microprocessor.

According to the embodiment, the RF signals which are supplied from the magnetic heads 2 and 5 attached to the peripheral surface 12 of the rotary drum 11 corresponding to a plurality of channels are detected, thereby obtaining the envelope levels LRF0 and LRF1 of the RF signal every channel. The envelope levels LRF0 and LRF1 obtained for every channel are compared with the reference level. A control voltage according to the magnetic heads 2 and 5 for every channel is generated. The envelope levels LRF0 and LRF1 of the RF signal which is generated are controlled to constant levels by the control voltage. Therefore, the fine level adjustment can be easily performed for each of a plurality of channels. A fluctuation of the envelope level LRF of the RF signal can be prevented without adding any special circuit.

Since the proper gain control is executed to each of a plurality of channels, it is possible to prevent waveforms like mustaches from appearing on the envelope waveform WEN of the RF signal.

Even if the envelope level LRF of the RF signal increases due to a change in depth by the abrasion of the magnetic head, the output level of the RF signal can be always held to be constant. A deterioration in video signal characteristics due to a time-dependent change can be reduced.

Further, the adjusting works can be easily executed and the number of adjusting steps can be reduced.

The circuit operation will now be described with reference to FIGS. 3 and 4A to 4D.

FIG. 4A shows the envelope waveform WEN of the RF signal reproduced by the magnetic head 2 of the A channel and the magnetic head 5 of the B channel. FIG. 4B shows the switching pulse SWP. FIG. 4C shows the envelope waveform WEN1 which is generated from the detecting circuit 15.

For instance, as shown in FIG. 4A, when the magnetic head which is tracking on the magnetic tape 1 is switched from the magnetic head 5 of the B channel to the magnetic head 2 of the A channel at a time point t0, the switching pulse SWP is supplied to the switch 4 and the gate pulse generating circuit 19.

The RF signal reproduced by the magnetic head 2 of the A channel is supplied to the envelope detecting circuit 15 through the switch 4, reproducing amplifier 8, and band pass filter 9.

The envelope level LRF0 of the envelope waveform WEN1 which is generated from the detecting circuit 15 is converted into the digital data DDC by the A/D converter 17 and is supplied to the latch 20.

The gate pulse generating circuit 19 generates the high level ("1") sampling pulse PS for a period T2 of the next (½) field after the elapse of the period T1 of the (½) field in each of the periods T of one field from a time point t0 to a time point t3 and from a time point t3 to a time point t6 shown in FIG. 4D by using the leading or trailing edge of the switching pulse SWP as a reference. In FIG. 4D, $$T1 \approx T2 \approx T3 \approx (\tfrac{1}{3})T$$

(T denotes a period of one field.)

When the high level ("1") sampling pulse PS is supplied to the latch 20 for the above period T2, the data DDC of the envelope level LRF0 of the A channel supplied from the A/D converter 17 is fetched into the latch 20 and is supplied to the data processing circuit 21.

When the data DDC is supplied to the data processing circuit 21, it is compared with a predetermined reference data and the A channel error ER is formed. The error ER is written into the memory 22 and is supplied to the gain controller 25 through the D/A converter 24, so that the gain control signal SCG of the A channel is formed. The gain control of the reproducing amplifier 8 is executed by the gain control signal SCG. The envelope level LRF of the RF signal of the A channel on the output side of the reproducing amplifier 8 is controlled to be constant.

The tracing operation of the magnetic head 2 of the A channel to the magnetic tape 1 is finished at the time point t3. The tracing operation of the magnetic head 5 of the B channel to the magnetic tape 1 is started from the time point t3. Since the process until the envelope level LRF of the RF signal which is reproduced from the magnetic head 5 of the B channel is controlled to be constant is similar to that of the A channel, the overlapped description is omitted here.

As shown by the envelope waveform WEN1 of FIG. 4C, the envelope level LRF0 is sampled for the A channel and the envelope level LRF1 is subsequently sampled for the B channel.

The reason why the envelope levels LRF0 and LRF1 of the period T2 of the (½) field are sampled is to eliminate gentle slopes of the waveform at the leading and trailing edges of the envelope waveform WEN1 shown in FIG. 4C and to fetch the data DDC in the stable contact portions of the magnetic heads 2 and 5 for the magnetic tape 1.

As mentioned above, if a signal dropout has occurred, the dropout pulse PDO is supplied from the level comparator 16 to the gate pulse generating circuit 19. Therefore, no sampling pulse PS is supplied from the gate pulse generating circuit 19.

According to the recording and reproducing apparatus of the invention, the RF signals which are supplied from the magnetic heads attached to the peripheral surface of the rotary drum corresponding to a plurality of channels are detected, the envelopes of the RF signals of the respective channels are obtained, the envelope level obtained for every channel is compared with the reference level, the control voltage according to the magnetic head of each channel is generated, and the envelope level of the RF signal is controlled so as to be constant by the control voltage. Therefore, there are advantages such that the fine level adjustment can be easily executed for each of a plurality of channels and a fluctuation of the envelope level of the reproduced RF signal can be prevented without adding any special circuit.

Since the proper gain control is performed for each of a plurality of channels, there is an effect such it is possible to prevent that waveforms like mustaches from appearing on the envelope waveform of the reproduction RF signal.

There are also advantages such that even if the envelope level of the RF signal increases due to a change in depth by the abrasion of the magnetic head, the output level of the RF signal can be always held to be constant and the deterioration of the video signal characteristics due to a time-dependent change can be reduced.

There is, further, an advantage such that the adjusting works can be easily executed and the number of adjusting steps can be reduced.

Having described a specific preferred embodiment of the present invention with reference to the accompanying drawings, it is to be understood that the invention is not limited to this precise embodiment, and that various changes and modifications may be effected therein by one skilled in the art without departing from the scope of the spirit of the invention as defined in the appended claims.

What is claimed is:

1. A recording and reproducing apparatus in which signals are recorded onto and reproduced from a magnetic tape wound around a peripheral surface of a rotary drum by magnetic heads which are attached to the peripheral surface of the rotary drum corresponding to a plurality of channels, respectively, comprising at least:

means for detecting an envelope level of a reproduced RF signal which is derived from the magnetic head for each channel of said plurality of channels and providing a detection output representative thereof;

means for comparing the detection output and a reference level and for generating a control voltage representative thereof and corresponding to the magnetic head for every channel;

means for storing the control voltage; and means for controlling the envelope level of the reproduction RF signal to a constant level in accordance with a predetermined timing for supplying the control voltage.

2. An apparatus according to claim 1, wherein the means for detecting the envelope level of the reproduction RF signal includes a band pass filter to extract an RF signal at a frequency near a center carrier frequency.

3. An apparatus according to claim 1, wherein the means for storing the control voltage includes means for sampling the envelope level at a period level near an intermediate position of a period when the magnetic head of each channel tracks.

4. An apparatus according to claim 1, wherein the means for generating the control voltage includes means for controlling the sampling of the envelope level of the reproduction RF signal when a signal dropout has been detected by comparing the detection output and the reference level.

5. A recording and reproducing apparatus in which signals are recorded onto and reproduced from a magnetic tape wound around a peripheral surface of a rotary drum by magnetic heads which are attached to the peripheral surface of the rotary drum corresponding to a plurality of channels, respectively, comprising at least:

means for reproducing an RF signal of an envelope waveform from said magnetic head of at least a pair of said plurality of channels;

switching means responsive to a switching pulse for selecting an RF output signal from one of said pair of said plurality of signals;

envelope detecting means for detecting an envelope of said RF signal selected by said switching means;

comparator means for comparing a voltage of the selected and detected RF signal with a reference voltage level and providing an output representative thereof;

means for latching said output from said comparator means according to a sampling pulse to sequentially fetch an envelope of a selected channel, said sampling pulse being related to said switching pulse; and means for comparing an output from said latching means with predetermined reference data held in a memory for making constant said envelope level of said reproduced RF signal.

6. An apparatus as set forth in claim 5 wherein said detected RF signal is converted to digital data by an A/D converter for comparison with predetermined digital reference data held in said memory, an error difference thereof being converted by a D/A converter to an analog gain control signal for said selected RF signal.

7. An apparatus as set forth in claim 5 wherein said comparator provides a dropout pulse when said detected RF signal level is less than a predetermined reference level.

8. An apparatus as set forth in claim 5 wherein said dropout output pulse controls said latch.

9. A recording and reproducing apparatus in which signals are recorded onto and reproduced from a magnetic tape wound around a peripheral surface of a rotary drum by magnetic heads which are attached to the peripheral surface of the rotary drum corresponding to a plurality of channels, respectively, comprising at least:

means for detecting an envelope level of a reproduced RF signal which is derived from the magnetic head for each channel of said plurality of channels and providing a detection output representative thereof;

means for comparing the detection output and a reference level and for generating a control voltage representative thereof and corresponding to the magnetic head for every channel;

means for storing the control voltage; and means for controlling the envelope level of the reproduction RF signal to a constant level in accordance with a predetermined timing for supplying the control voltage; and means for controlling the gain of said RF signal as derived from the magnetic head in response to said controlling means.

10. An apparatus according to claim 9, wherein the means for detecting the envelope level of the reproduction RF signal includes a band pass filter to extract an RF signal at a frequency near a center carrier frequency.

11. An apparatus according to claim 9, wherein the means for storing the control voltage includes means for sampling the envelope level at a period near an intermediate position of a period when the magnetic head of each channel tracks.

12. An apparatus according to claim 9, wherein the means for generating the control voltage includes means for controlling the sampling of the envelope level of the reproduction RF signal when a signal dropout has been detected by comparing the detection output and the reference level.

* * * * *